(Model.)
E. D. ROTH.
CUTTING APPARATUS FOR HARVESTERS.
No. 295,813. Patented Mar. 25, 1884.
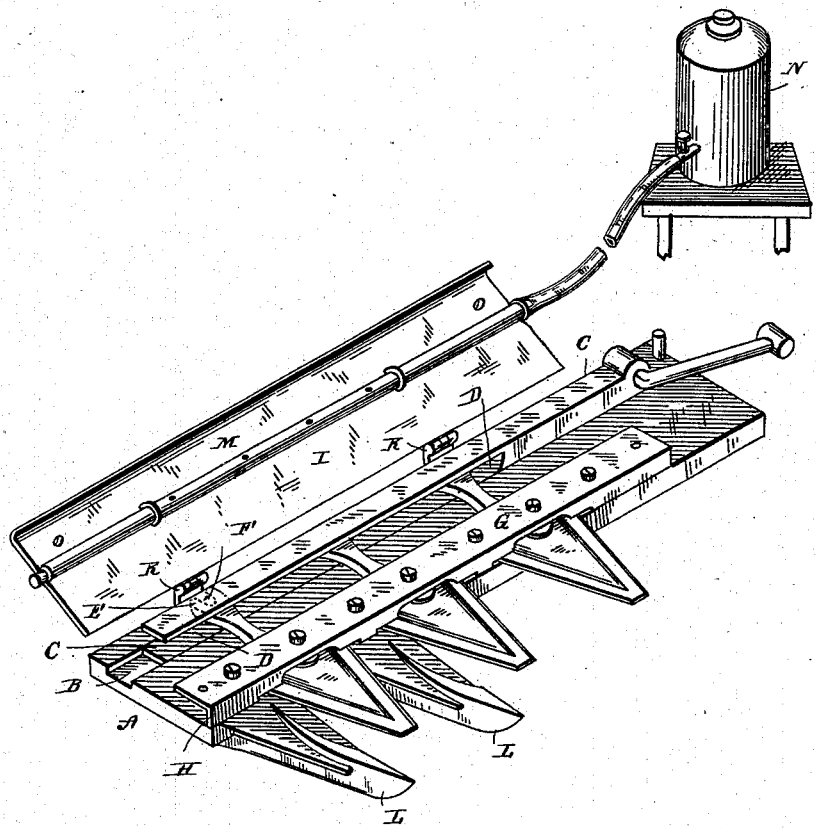
Witnesses.
Edwin L. Jewell.
J. J. McCarthy.
Inventor.
Elias D. Roth,
By C. M. Alexander
Attorney.

United States Patent Office.

ELIAS D. ROTH, OF FORT COLLINS, ASSIGNOR OF ONE-HALF TO JACOB A. PEARCE, OF BUENA VISTA, COLORADO.

CUTTING APPARATUS FOR HARVESTERS.

SPECIFICATION forming part of Letters Patent No. 295,813, dated March 25, 1884.

Application filed April 14, 1883. (Model.)

*To all whom it may concern:*

Be it known that I, ELIAS D. ROTH, a citizen of the United States, residing at Fort Collins, in the county of Larimer and State of Colorado, have invented certain new and useful Improvements in Cutting Apparatus, of which the following is a specification, reference being had therein to the accompanying drawing.

This invention relates to certain improvements in cutting apparatus for mowing and reaping machines; and it has for its objects, first, to provide an improved means of connecting the vibrating knives or cutters to the reciprocating bar by which they are operated, and, second, to provide an improved tension device by means of which the said cutters may be tightened upon their bearings to compensate for wear.

The above-mentioned objects I attain by the means illustrated in the accompanying drawing, which is a perspective view of a cutting apparatus embodying my invention.

The letter A indicates a finger-bar, which is provided with a longitudinal groove, B, on its upper face near its rear edge, in which the reciprocating bar C is adapted to slide. The said reciprocating bar is provided with a longitudinal slot, D, extending nearly its entire length, in which the rear ends of the vibrating knives or cutters set. The said rear ends of the knives or cutters are provided with open slots E, through which pass the pins F, which are secured in the reciprocating bar C, above mentioned. This slotted bar C covers and protects the slotted ends of the cutters from the collection of foreign matter, and at the same time obviates any displacement of the cutters. The vibrating knives or cutters are pivoted to the finger-bar near its forward edge, and above them is located a steel plate, G, which has a flange, H, at its forward edge, cut away, as indicated, at suitable points, so as to set over the vibrating cutters. The said plate is confined by means of screws, so that it may be tightened upon the cutters when desired, to compensate for wear. This is accomplished by removing the plate and filing down the flange H until a close adjustment is made, and thus the wear is taken up.

The letter I indicates a metallic plate having a downward flange at its forward edge, and hinged at its rear to the vertical standards K, which are of such height that when closed down upon the cutter-bar it will cover the same and protect the working parts.

The letter L indicates the fingers or guards, which are secured to and project from the forward edge of the finger-bar in the usual manner. The said fingers or guards are curved upward on their lower edges from the rear to the point, whereby they are prevented from catching in the ground.

Having thus described my invention, what I claim, and desire to secure by Letters Patent, is—

1. In a cutter-bar for a harvester, the slotted reciprocating bar with pins F, in combination with the pivoted cutters having the rear slotted ends passed into the slot of the reciprocating bar and engaging with their respective pins, whereby the slots of the cutters are protected and upward displacement obviated, as described.

2. In a cutter-bar for a harvester, the combination, with the pivoted cutters, of the tension-bar G, provided with the flange H, having recesses formed therein for the passage and operation of the pivoted cutters, substantially as and for the purposes set forth.

In testimony whereof I affix my signature in presence of two witnesses.

ELIAS D. ROTH.

Witnesses:
J. J. MCCARTHY,
W. D. ALEXANDER.